(12) United States Patent
Moyerman et al.

(10) Patent No.: US 9,863,772 B1
(45) Date of Patent: Jan. 9, 2018

(54) SKYDIVING TRAJECTORY AND COORDINATION FEEDBACK SYSTEM

(71) Applicant: Intel Corporation, Santa Clara, CA (US)

(72) Inventors: Stephanie Moyerman, Phoenix, AZ (US); Tyler Fetters, Hillsboro, OR (US); James Brian Hall, Tucson, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/194,131

(22) Filed: Jun. 27, 2016

(51) Int. Cl.
*G01C 21/00* (2006.01)
*G01C 21/16* (2006.01)
*G08B 21/04* (2006.01)
*G08B 6/00* (2006.01)
*G08B 5/22* (2006.01)
*G08B 3/10* (2006.01)
*H04L 29/08* (2006.01)

(52) U.S. Cl.
CPC .............. *G01C 21/165* (2013.01); *G08B 3/10* (2013.01); *G08B 5/22* (2013.01); *G08B 6/00* (2013.01); *G08B 21/043* (2013.01); *H04L 67/12* (2013.01)

(58) Field of Classification Search
CPC .......... G01C 21/165; G08B 3/10; G08B 5/22; G08B 6/00; G08B 21/043; H04L 67/12
USPC .......................................................... 701/482
See application file for complete search history.

(56) References Cited

U.S. PATENT DOCUMENTS

| 5,622,337 | A | * | 4/1997 | Unruh | B64D 23/00 244/142 |
| 5,671,162 | A | * | 9/1997 | Werbin | G01C 5/06 702/130 |
| 2009/0326894 | A1 | | 12/2009 | Chan et al. | |
| 2014/0257744 | A1 | * | 9/2014 | Lokshin | A61B 5/1123 702/141 |
| 2016/0256082 | A1 | * | 9/2016 | Ely | A61B 5/0024 |

OTHER PUBLICATIONS

"L/D Vario", Google Play, Version: 2.0.22, [Online]. Retrieved from the Internet: <URL: https://play.google.com/store/apps/details?id=com.PFM.LDVario>, (Updated: Oct. 20, 2015), 3 pgs.
"Tactix: Owner's Manual", Garmin, (Sep. 2013), 24 pgs.

\* cited by examiner

*Primary Examiner* — Marthe Marc-Coleman
(74) *Attorney, Agent, or Firm* — Schwegman Lundberg & Woessner, P.A.

(57) ABSTRACT

A system for skydiving trajectory and coordination feedback for a user. The system includes a controller coupled to a plurality of sensor inputs. The controller determines a user drag through air based on input data from the plurality of sensor inputs. The controller also receives a user flightpath and determines a projected user trajectory based on the user drag. The controller also determines user drag adjustments to align the projected user trajectory with the received user flightpath. At least one of an aural, haptic, or visual feedback device is coupled to the controller to provide feedback to the user in response to the user drag adjustments.

25 Claims, 5 Drawing Sheets

SKYDIVING TRAJECTORY AND COORDINATION FEEDBACK SYSTEM

TECHNICAL FIELD

Embodiments described herein pertain in general to skydiving and in particular to determining trajectory and providing feedback to a skydiver and coordination between multiple skydivers.

BACKGROUND

Skydiving is a popular sport that includes many variants and competitions such as swooping, accuracy, wing suiting, and formation diving. The competitions depend on performing complex maneuvers that optimize speed, elevation, parachute deployment time, and/or limb position. Additionally, the military use of skydiving depends on precision timing and coordinated teamwork for flawless execution during military operations or airshow exhibitions.

Control of trajectory during skydiving requires the skydiver to move their limbs (i.e., arms, legs) to control their trajectory and maneuver while falling. However, the skydiver presently has to rely on trial and error while falling in order to maneuver. In other words, the skydiver initially adjusts their limb position and determines the response to their trajectory based on the limb position adjustment. The skydiver repeats this until the maneuver has been accomplished. This is not an accurate method for trajectory control.

DETAILED DESCRIPTION

Most skydiving parameters may be linked to the user's drag that is determined mainly by the user's body position as they fall. For example, the acceleration of a user both vertical and horizontally, the terminal velocity of the user, and the distance traveled horizontally may be adjusted by adjustment of the user's drag coefficient.

A user may adjust their drag coefficient and, thus, change their trajectory (e.g., flightpath), by movement of their limbs, hands, and/or feet. The skydiving trajectory and feedback system provides trajectory information to a user based on continuous calculation of the user's drag coefficient. Any adjustments the user makes to their drag coefficient by moving one or more limbs is reflected in an updated drag coefficient that is communicated to the user to enable the user to travel a flight trajectory more closely aligned with a desired trajectory.

Figure 1:
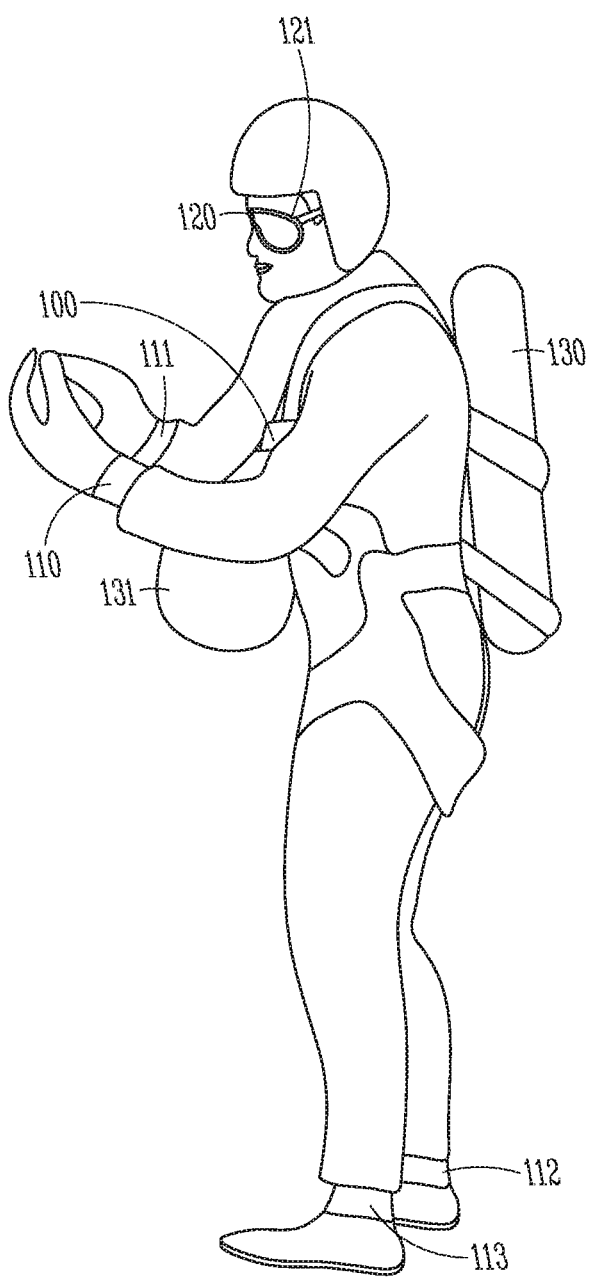
FIG. 1 illustrates a user incorporating the skydiving trajectory and feedback system, according to various embodiments.

FIG. 1 illustrates a user incorporating the skydiving trajectory and feedback system, according to various embodiments. The components of the system shown in FIG. 1 are for purposes of illustration only. Other embodiments may use different components to achieve substantially similar results.

The system includes a control unit 100 that houses a controller and one or more sensors (e.g., accelerometer, magnetometer (compass), gyroscope, altimeter, barometer, thermometer, vertical speed sensor, global positioning system (GPS) receiver). The control unit 100 may also include any means for communication such as radios and antennas for communicating with other users' systems and/or with various wireless sensors of the user's system.

The location of the control unit 100 shown in FIG. 1 is for purposes of illustration only. The unit 100 is shown located on the reserve parachute 131 but may be located anywhere on the user's body. The controller, radios, antennas, and/or sensors may also be distributed on various locations on the user's body.

The system may additionally include a position device 110-113 on each of the user's limbs. In other embodiments, additional position sensors may be distributed on various locations of the user's body such as feet and hands.

The position devices 110-113 may include accelerometers, gyroscopes or other sensors to determine relative position and movement of the user's limbs. The position devices 110-113 may also include radio transceivers and antennas for communication between the devices 110-113 and the system controller 100.

The position devices 110-113 may further include user feedback devices (e.g., haptic response devices) that vibrate or provide other sensations individually to each of the user's limbs. The vibration or other sensations may be used to inform the user about the status of each respective limb as described subsequently with reference to the system operation. Such sensations may be used in a training environment if the system is set to a training mode.

The relative position of each respective limb may be determined relative to a certain point on the user's body. For example, if the control unit 100 is located as shown on the user's chest or back-up parachute, the control unit 100 may be used as the reference point for where the user has positioned their limbs during the fall.

In another embodiment, the user may stand on the ground and calibrate an initial position of each of the position devices 110-113. Thus, any further determination of position of the position sensors is accomplished relative to the initial calibrated position of each device 110-113.

The position devices 110-113 may be coupled to the control unit 100 of the system through a wired connection or a wireless channel. For example, each position devices 110-113 may include a radio and antenna for communicating with the control unit 100 using one or more wireless protocols. Such wireless protocols may include Bluetooth, any WiFi standard (e.g., Institute of Electrical and Electronics Engineers 802.11), or any other relatively low power communication standard.

The user's main parachute 130 may also include a sensor to inform the system when the parachute 130 has been deployed. A deployed parachute indication may be used to shut off any further operations by the system.

The system may further include a display 120 as another user feedback device for providing feedback to the user. The display 120 may be built into the user's goggles 121 or glasses. In other embodiments, a display may be mounted on the user's wrist so that it is visible when the user is in a falling position. As with the other elements of the system, the display 120 may be linked with the control unit 100 through a wired or a wireless link.

System sensors may also include image sensor that sense surrounding images of other skydivers. The image sensors may be mounted in the goggles 121 as part of the display 120 or elsewhere on the user's head such that they point in the direction that the user is looking. Other image sensors may be mounted on the user's position devices 110-113 and the resulting images stitched together by the controller to generate a 360° image of the user's environment. Such an image may be used by the controller to determine the user's position relative to other skydivers and/or the rate at which a ground image is expanding and, thus, the user's vertical speed.

As used herein, an altimeter may be a barometric altimeter or a radar altimeter. The barometric altimeter uses the barometric pressure to determine the user's altitude. Once the barometric altimeter is calibrated to ground level, the altimeter may use the pressure difference between that calibration setting and its present pressure to determine its altitude. This may be accomplished mechanically with bellows or with an electronic sensor.

The radar altimeter determines a distance to the ground by transmitting a radio or laser signal to the ground. The radar altimeter can then measure a time it takes for a return signal to reflect from the ground. Multiplying the time between transmission of the signal and receipt of the reflected signal with the speed of light and dividing by two yields the height of the user above the ground.

Figure 2:
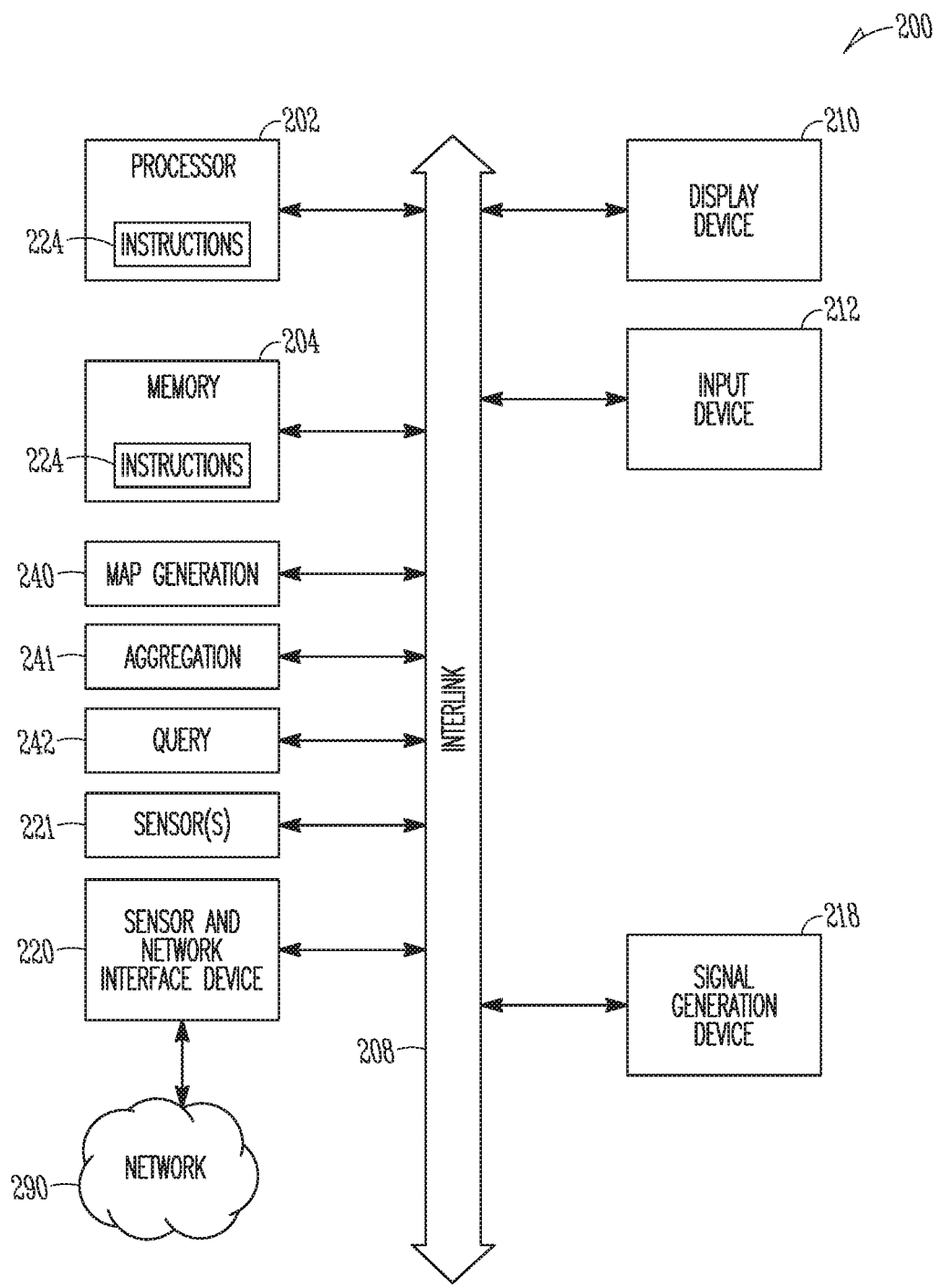
FIG. 2 illustrates a block diagram of the skydiving trajectory and feedback system, according to various embodiments.

FIG. 2 illustrates a block diagram of the skydiving trajectory and feedback system 200, according to various embodiments. The system 200 may also be referred to as a computer to execute any methods disclosed herein.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 202 may be configured by firmware or software (e.g., instructions, an application portion, or an application) as a module that operates to perform specified operations. In an example, the software may reside on a non-transitory computer readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 202 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

The system 200 may include a hardware processor 202 (e.g., a central processing unit (CPU), a graphics processing unit (GPU), a hardware processor core, or any combination thereof), and memory 204. The processor 202 and memory 204 together may be referred to as a controller. The various elements of the computer may communicate with each other over an interlink (i.e., bus) 208.

The computer 200 may further include a display unit 210 and an alphanumeric input device 212 (e.g., a keypad) coupled to the bus 208. In an example, the display unit 210 and the input device 212 together may be a touchscreen display. The touchscreen display may be mounted on the user's wrist for easy access during a fall.

The system 200 may additionally include a storage device (e.g., flash memory, random access memory (RAM), read only memory (ROM)) 216, a signal generation device 218 as another user feedback device (e.g., a speaker), a sensor (e.g., feedback device) and network interface device 220, and one or more sensors 221. As described previously, the sensors may include accelerometers, compasses, gyroscopes, altimeters, barometers, thermometers, vertical speed sensors, and/or GPS sensors located in one or more locations of the system (e.g., control unit 100, position devices 110-113).

The speaker may be part of a headset worn by the user or built into a user's helmet and used to provide computer generated voice feedback to the user regarding the results of any methods disclosed herein. For example, the computer generated voice may instruct the user to move a particular limb outwards in order to increase drag or to bring their legs together to decrease drag.

The memory 204 may include at least one transitory or non-transitory computer-readable medium on which is stored one or more sets of data structures or instructions 224 (e.g., software) embodying or utilized by any one or more of the techniques, methods, or functions described herein. The instructions 224 may also reside, at least partially, in additional computer-readable memories such within the hardware processor 202 during execution thereof by the system 200. In an example, one or any combination of the hardware processor 202, the memory 204 or the mass storage device 216 may constitute non-transitory computer-readable media.

The network interface device 220 may also be a sensor interface and include any wired or wireless interface, such as a radio, for reading sensors over a wireless channel. For example, the sensor interface may be a feedback device interface that communicates with remote sensors or feedback devices to collect data or transmit feedback signals to at least one of aural, haptic, or visual feedback devices in response to user drag adjustments as described subsequently.

The radio may operate using a Bluetooth®, an IEEE 802.11 standard, or any other standard for reading data from sensors over a wireless channel. The network may be a peer-to-peer network, a local area network (LAN), or a wide area network (WAN) including the Internet.

One network may include a plurality of skydivers (i.e., group of skydivers) performing a coordinated skydive. Each skydiver has a respective skydiving trajectory and coordination feedback system that communicates amongst that group of skydivers as described subsequently. Another network may include a plurality of wireless sensors or wireless feedback devices located on the user.

In operation, the various embodiments of the method of operation of the skydiving trajectory and feedback system are based on dynamic and continuous calculation of the user's drag as they fall. The calculations for user information may be executed locally by the controller on each user's body worn system, including inter-skydiver communication for team maneuvers. In another embodiment, a central location may be used for all of the calculations for user drag. For example, a computer on the ground, coupled to a radio transceiver for communicating with one or more skydivers, may be a central processing site for all of the computations.

Figure 3:
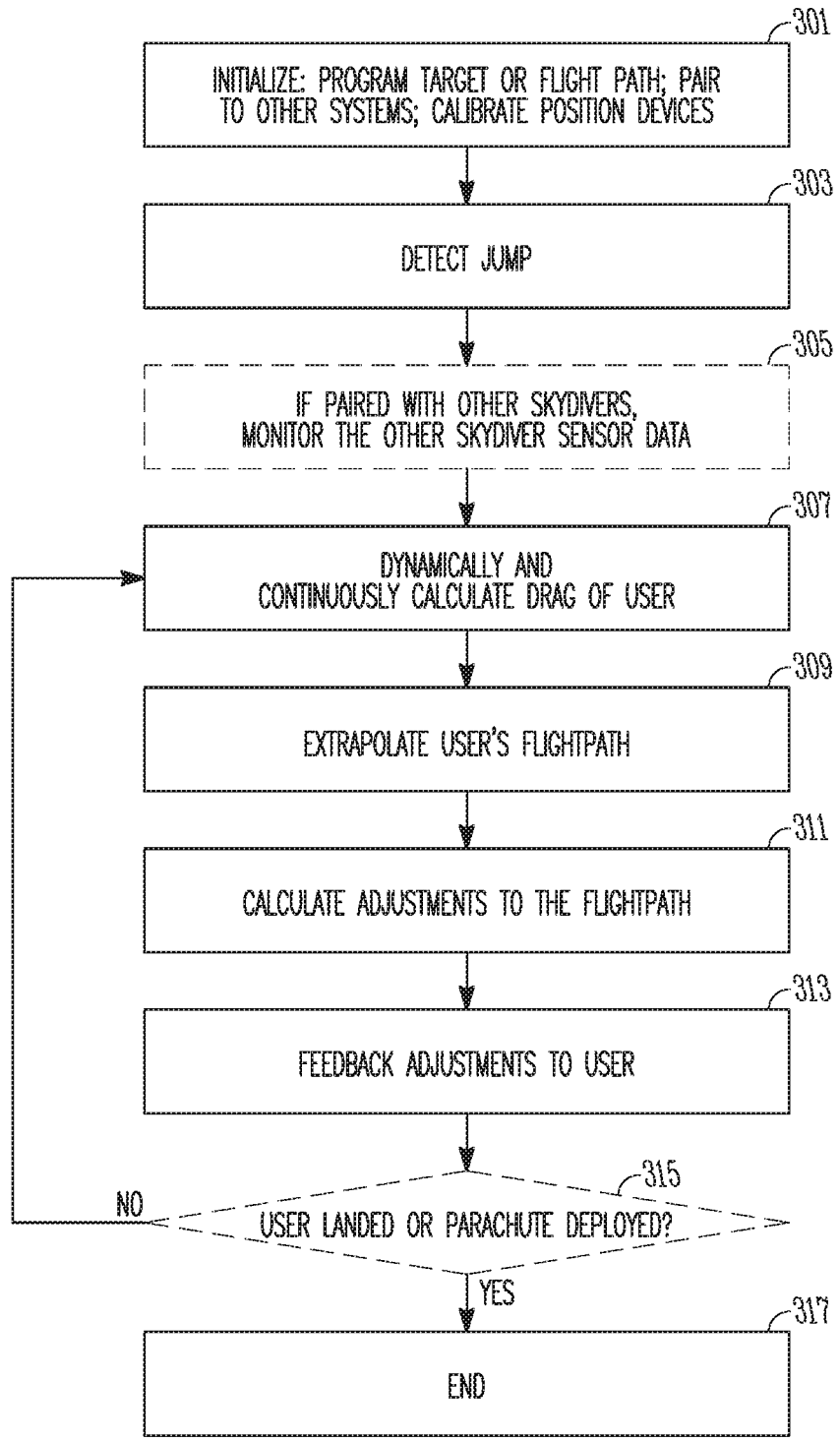
FIG. 3 illustrates a flowchart of a method of operation of the skydiving trajectory and feedback system, according to various embodiments.

FIG. 3 illustrates a flowchart of a method of operation of the skydiving trajectory and feedback system, according to various embodiments. In block 301, an initialization step may be performed. The initialization may include programming a desired target (e.g., destination) on the ground or a desired flight path into the system. If an initial position of the sensor devices is to be calibrated, the user may get into a calibration position with their arms and legs in a particular reference position from which subsequent measurements will be related. During the initialization, the user system may also be paired to other systems (e.g., peer-to-peer network) if the user is jumping with a group of skydivers.

During the skydive, each individual system may operate independently or together within the peer-to-peer network. In the peer-to-peer network, each of the respective user systems communicates with other systems in a plurality of systems using their respective radio. The group of skydivers may be coordinated by one of the skydiving trajectory and feedback systems acting as a master system while other systems in the peer-to-peer network act as slave systems. The master system may be fixed and decided prior to flight or the master system may have the lowest altitude (e.g., relative to the ground) of the plurality of systems and changed dynamically during flight whenever the altitude of one system becomes lower than the other systems.

In block 303, the jump from an elevation is detected. The jump may be from an aircraft, a cliff, a bridge, or some other relatively high location that allows a freefall descent.

An accurate determination of the jump being started should be made prior to beginning collection of data from the sensors for drag determination. A rapid change in altitude or acceleration of the user may be the result of other causes and not an accurate determination for initiation of the jump. For example, aircraft turbulence may cause the user to make a rapid, change in altitude and acceleration. Thus, sensor data from more than just the altimeter and accelerometer may be analyzed in order to determine if the use has exited the aircraft.

Figure 4A:
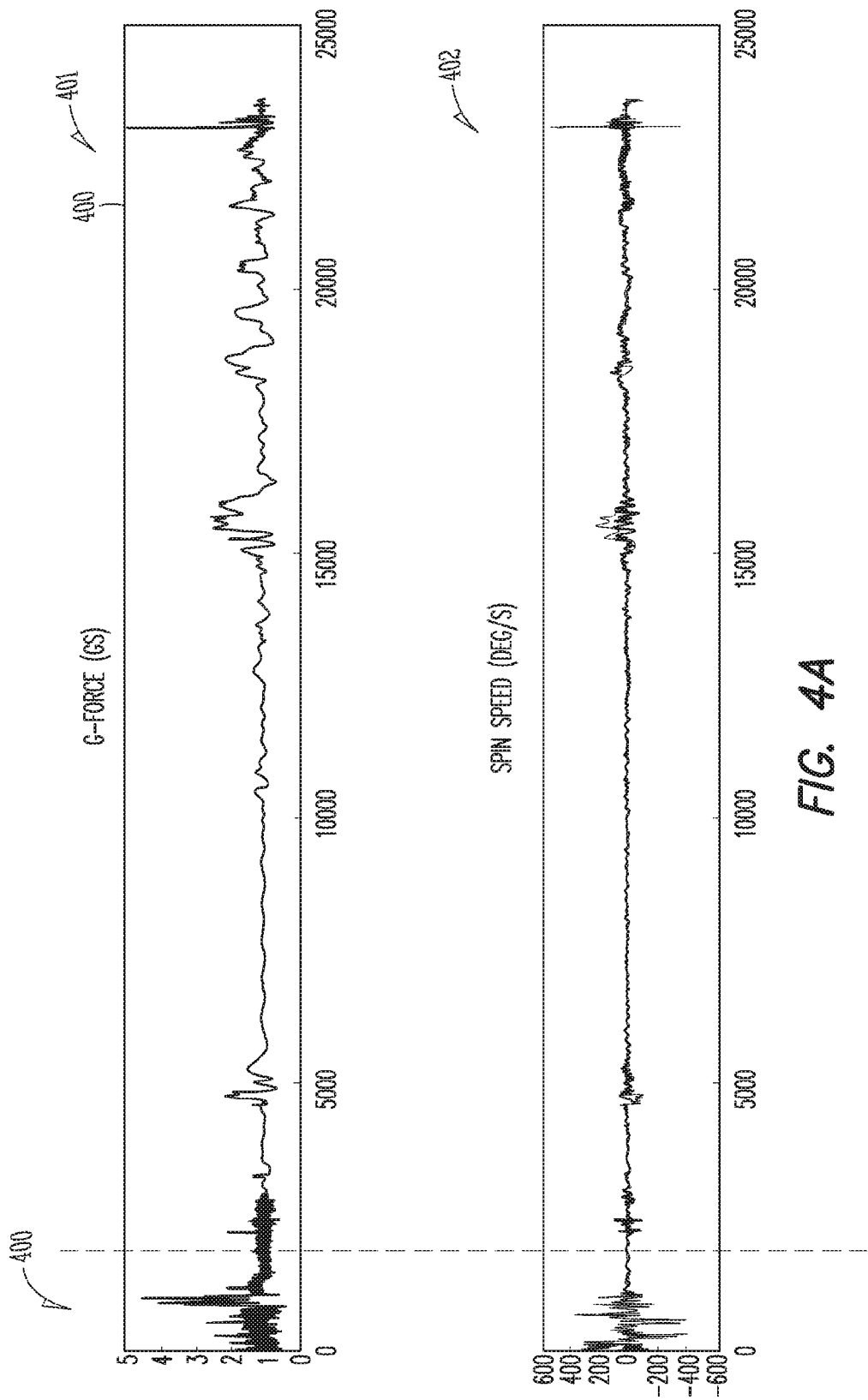
FIGS. 4A and 4B illustrates graphs of processed sensor data from a skydive jump, according to various embodiments.
Figure 4B:
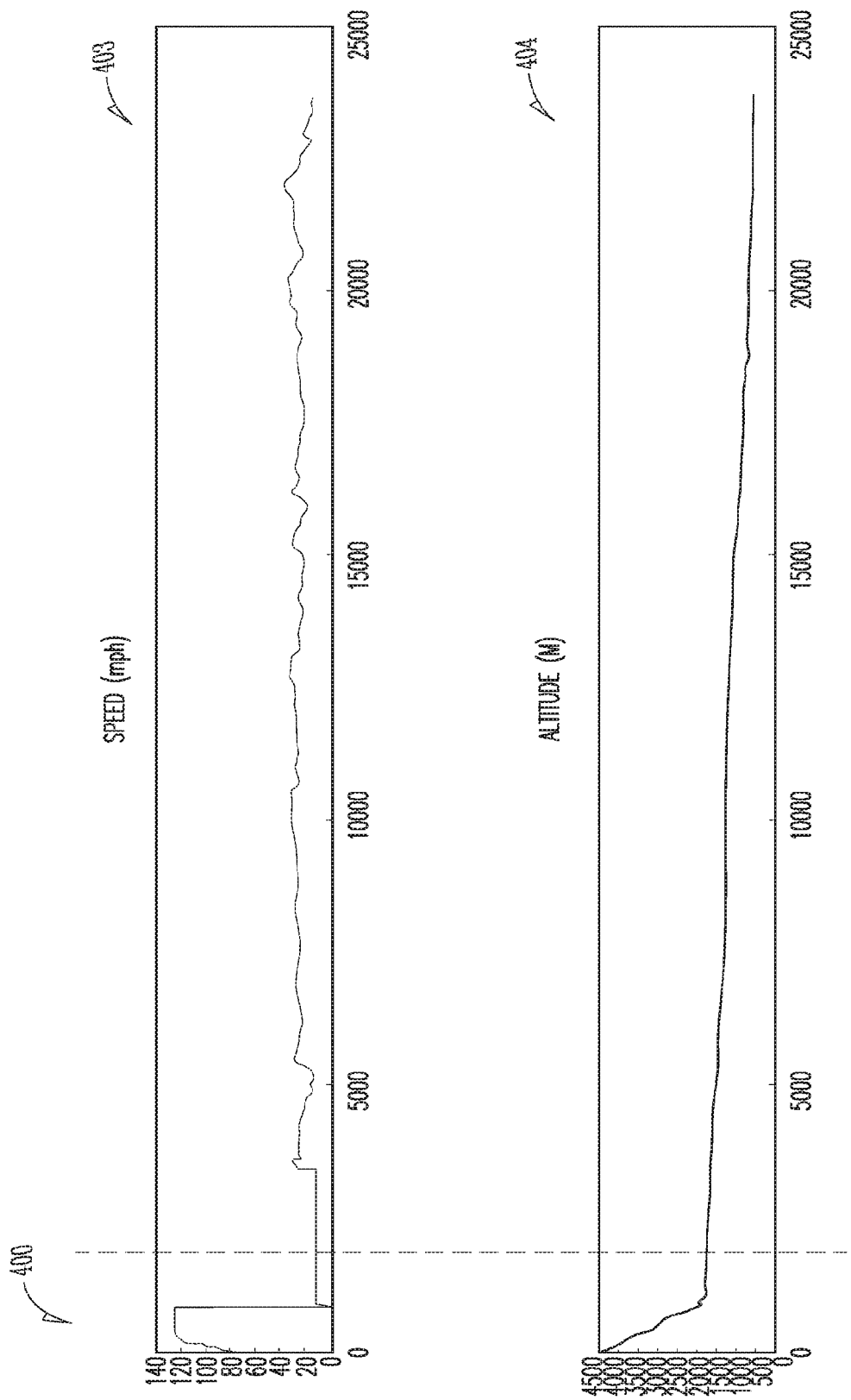

FIGS. 4A and 4B illustrate graphs of processed sensor data from a skydive jump, according to various embodiments. The illustrated data was collected from a single skydive jump, starting from the exit from the aircraft. One graph 401 illustrates gravity force (G-force) on the y-axis versus a number of samples on the x-axis, where each sample is approximately 8.33 milliseconds (ms). Another graph 402 illustrates spin rate (degrees per second) with degrees of rotation on the y-axis and number of samples on the x-axis. Another graph illustrates the user's horizontal speed (in miles per hour) with respect to time with the speed along the y-axis and number of samples along the x-axis. Yet another graph illustrates the user's altitude with respect to time with altitude in feet along the y-axis and number of samples along the x-axis.

The graphs 401-404 of FIGS. 4A and 4B show that during an initial time period 400 the user is subjected to a spike in G-force, random and rapid rotations, a relatively abrupt cessation of horizontal velocity, and a relatively rapid altitude decline. Any one of these by themselves may not be an indication that the jump has been initiated but all of them together provide a very good indication that the user has initiated the jump. Thus, a combination of one or more of a change in acceleration greater than an acceleration threshold (e.g., >9.8 m/s$^2$), a change in user rotation greater than a rotational threshold (e.g., >90 degrees/s), a decrease in horizontal velocity of approximately eight kilometers per hour over a one second time period, monitoring the user's altitude for a predetermined time, and/or a rate of change in altitude greater than an altitude rate of change threshold (e.g., >10 m/s), and continues to decrease for the next few seconds, are example indications of the user beginning a jump.

Referring again to FIG. 3, in block 305, if the user is paired to other skydivers in a group of skydivers, the flightpaths of those skydivers are monitored over a radio channel. For example, the flightpaths of the other skydivers of the group, as determined by calculated drag, GPS movement, and/or other sensor data from each respective skydiver, is received by the user's system. Each skydiver of the group may also have a label (e.g., name, number) associated with each respective skydiver's sensor data in order for the user's system to coordinate their flightpath with the flightpaths of each of the other skydivers of the group. If the user is not paired with one or more other skydivers, this monitoring step is not performed.

In block 307, after the initial jump from elevation is detected, the drag is dynamically and continuously calculated at a substantially constant rate (e.g., approximately 2 Hertz (Hz)). Thus, the various system sensors may be sampled at the same rate or some other rate, depending on the sensor. For example, GPS receivers typically update at approximately 5 Hz, so sampling the GPS sensor any faster than 5 Hz would yield the same value for multiple samples.

The drag may be calculated continuously until the user's parachute is deployed. In another embodiment, the drag may be calculated until the user has touched down on the ground in order to provide feedback to the user while under the canopy. The drag, in addition to other data (e.g., horizontal speed, altitude, vertical speed, spin, etc.), may then be used to calculate a future trajectory of the user. If any flightpath adjustments are needed to achieve the programmed flightpath or target, the system provides feedback to the user to adjust their coefficient of drag (i.e., information on how to adjust body position) so that changes can be made to the flightpath. As described subsequently in greater detail, the feedback may be haptic, auditory, and/or visual.

The user's drag at any one point in time may be calculated by a calculation of the terminal velocity of the user. For example, sensor data from a previous time period (e.g., 1 second) may be used to calculate a first fit for a drag coefficient value ($C_D$) as follows:

$$V(t) = -V_\infty \tanh\left(\frac{gt}{V_\infty}\right); \tag{1}$$

$$z(t) = z_0 - \frac{V_\infty^2}{g} \ln\left(\cos\frac{gt}{V_\infty}\right) \tag{2}$$

where V(t) is the vertical velocity of the user at time t, g is the acceleration due to gravity constant (e.g., 32 ft/s²), $z_0$ is the altitude of the user at a previous time period (e.g., 1 second (s) prior), and $V_\infty$ is the terminal velocity of the user. The terminal velocity of the user is given by:

$$V_\infty = \sqrt{2\ mg/\rho C_D A} \quad (3)$$

where ρ is a density of air constant, $C_D$ is the coefficient of drag, m is the mass of the user, and A is the cross-sectional area of a falling body (i.e., the user). The drag of the user may thus be determined by:

$$f_{drag} = -\tfrac{1}{2}(C_D \rho A v^2) \quad (4)$$

In other words, the air resistance (e.g., drag) of the user is approximately proportional to the square of the velocity of the user falling through the air.

By knowing the altitude as a function of time (derived from the altimeter and clock of the system), the last second worth of data may be fit to equation (1) via a linear least squares regression to derive the terminal velocity. The terminal velocity may then be used to calculate the user's velocity and altitude as a function of time and, thus, the user's drag (e.g., drag coefficient).

Referring again to FIG. 3, in block 309, given a time versus altitude production and the current groundspeed (e.g., from the GPS), the three dimensional location of the user's flightpath may be extrapolated into the future (e.g., projected trajectory). In other words, the user's location three dimensionally in the fall is determined a certain time (e.g., 1 second) into the future. In block 311, adjustments to the current flightpath are calculated in order to achieve the desired flight path that was supplied by the user. This may be accomplished by applying a perturbation algorithm to the current user dive parameters (e.g., drag coefficient, horizontal speed, heading) until the user supplied flightpath and actual flight path are aligned. This provides the user drag adjustments to align the projected trajectory with the desired flightpath.

In block 313, the user is supplied feedback regarding the user drag adjustments in order to adjust the dive parameters and align the projected trajectory with the user supplied (i.e., programmed) flightpath. The feedback may be haptic by using the position devices 110-113 (FIG. 1) on the user's wrists and ankles to vibrate telling the user to move that particular limb. The feedback may be aural by using a headset the user is wearing to present the user with a computer generated voice telling the user to move particular limbs either outwards or inwards to increase or decrease drag. The feedback may also be visual by presenting the user with graphics on a display in her or his goggles. The graphics may indicate the position for the user to place particular ones of his or her limbs in order to adjust the user drag and align the projected trajectory with the desired, user supplied flightpath. The feedback may also be any combination of these types of feedback.

For immediate feedback to the user, the drag force may be calculated and the trajectory projection updated relatively frequently (e.g., >2 Hz) using the last second worth of data in a rolling buffer. Additionally, since terminal velocity is uniquely determined by the user cross-sectional area, the system may be used to track the user's body position.

In block 315, it is determined whether the parachute has been deployed or the user has landed so that the method will stop updating and providing feedback to the user. The dynamic and continuous updating of the drag of the user and the feedback to the user repeats (e.g., steps 307, 309, 311, 313) until the parachute has been deployed or the user landed, depending on the embodiment. Once one of the completion events occur, the process ends in block 317.

For teams of skydivers or moving targets or trajectories, each flightpath may be uniquely determined by the current horizontal speed, altitude, and drag coefficient as defined above. Additionally, for calculating distances, the GPS coordinates of each party may be transmitted as well. Coordination between moving team members may also be projected according to the above embodiments. If a team performs a group jump, all of the users' systems broadcast the above data and their respective trajectory projection updates to all other paired team members. The updates may be transmitted at the same rate of the trajectory projection updates (e.g., >2 Hz).

Since the respective systems are time tracking, they know at all times which member of the paired team jumped first and/or which team member is lowest in altitude. This team member becomes the lead (e.g., master in the network) and the rest of the paired team members follow that lead (e.g., slaves in the network). The lead skydiver's system operates as described previously providing feedback to the team's target in an optimal way. All other paired team members receive the transmitted dive parameters (e.g., drag coefficient, horizontal speed, heading) from the current lead skydiver and their respective systems project their own trajectories from their respective GPS coordinates to follow the lead skydiver as a target. The controllers for each respective skydiver may then use the received dive parameters to adjust their own flightpaths in order to follow the lead team member.

ADDITIONAL NOTES & EXAMPLES

Example 1 is a system for skydiving trajectory and coordination feedback for a user, the system comprising: a controller coupled to a plurality of sensor inputs, the controller to determine a user drag through air based on input data from the plurality of sensor inputs, the controller to receive a user flightpath, determine a projected user trajectory based on the user drag, and determine user drag adjustments to align the projected user trajectory with the received user flightpath; and a feedback device interface coupled to the controller to provide feedback signals to at least one of aural, haptic, or visual feedback devices in response to the user drag adjustments.

In Example 2, the subject matter of Example 1 optionally includes wherein the input data comprises barometric pressure, acceleration of the user, global position satellite coordinates of the user, vertical speed of the user, horizontal speed of the user, and heading of the user.

In Example 3, the subject matter of any one or more of Examples 1-2 optionally include wherein the controller is further to determine when the user has initiated a skydive jump prior to determining the drag of the user.

In Example 4, the subject matter of Example 3 optionally includes wherein the controller further determines the skydive jump in response to the input data indicating a change in at least one of a user acceleration greater than an acceleration threshold, a user rotation greater than a rotation threshold, a user horizontal velocity greater than a horizontal velocity threshold, or a user altitude rate of change.

In Example 5, the subject matter of any one or more of Examples 1-4 optionally include a speaker coupled to the controller to provide aural feedback to the user regarding the user drag adjustments.

In Example 6, the subject matter of any one or more of Examples 1-5 optionally include a display coupled to the controller to provide visual feedback to the user regarding the user drag adjustments.

In Example 7, the subject matter of any one or more of Examples 1-6 optionally include haptic response devices coupled to the controller to provide haptic feedback to the user regarding the user drag adjustments.

In Example 8, the subject matter of any one or more of Examples 1-7 optionally include wherein the plurality of sensors comprise at least one of an accelerometer, magnetometer, gyroscope, altimeter, barometer, thermometer, vertical speed sensor, or global positioning system (GPS) receiver.

In Example 9, the subject matter of Example 8 optionally includes a plurality of position devices coupled to the controller, the plurality of position devices to determine a relative position of a plurality of limbs of the user, each of the plurality of position devices comprising at least one of the plurality of sensors.

In Example 10, the subject matter of Example 9 optionally includes a radio and antenna coupled to the controller.

In Example 11, the subject matter of Example 10 optionally includes wherein each of the plurality of position devices comprises a radio to communicate with the radio coupled to the controller.

In Example 12, the subject matter of Example 11 optionally includes wherein the controller is a master network controller of a plurality of network controllers and transmits drag coefficient, horizontal speed, and heading of the user to the plurality of network controllers.

Example 13 is a system for skydiving trajectory and coordination feedback for a user, the system comprising: a plurality of sensors for measuring at least one of user altitude, user horizontal speed, or user spin rate; a controller coupled to the plurality of sensors, the controller to determine, based on input data from the plurality of sensors, a jump from an elevation, a coefficient of drag of the user through air, and a projected trajectory of the user through the air, the controller to determine user drag adjustments to align the projected trajectory with a desired user flightpath; and a user feedback device, coupled to the controller, to communicate the user drag adjustments to the user.

In Example 14, the subject matter of Example 13 optionally includes a plurality of position devices coupled to the controller, wherein the controller is further to calibrate a relative position of each of the plurality of position devices prior to flight.

In Example 15, the subject matter of any one or more of Examples 13-14 optionally include wherein the controller is further to calculate a terminal velocity of the user through the air based on the coefficient of drag of the user and a cross-sectional area of the user.

Example 16 is a method for skydiving trajectory and coordination feedback, the method comprising: receiving a desired user flightpath; detecting when a user has jumped from an elevation; determining a drag of the user through air; determining a projected trajectory of the user through the air based on the drag; determining adjustments to the drag to align the projected trajectory with the desired user flightpath; and generating user feedback comprising indications on the adjustments to the drag.

In Example 17, the subject matter of Example 16 optionally includes calibrating position devices, located on limbs of the user, to a reference point.

In Example 18, the subject matter of any one or more of Examples 16-17 optionally include pairing a first controller on the user with at least a second controller on a second user to form a network of controllers.

In Example 19, the subject matter of Example 18 optionally includes determining an altitude for each of the first and second controllers, after detecting that the user has jumped; setting the first controller to be a master controller when the first controller comprises a lower altitude than the second controller; and setting the second controller to be the master controller when the second controller comprises a lower altitude than the first controller.

In Example 20, the subject matter of Example 19 optionally includes monitoring, over a radio channel, sensor data received from other controllers in the network of controllers.

In Example 21, the subject matter of any one or more of Examples 16-20 optionally include wherein determining the drag of the user through the air comprises determining a terminal velocity of the user through the air based on a cross-sectional area of the user.

In Example 22, the subject matter of Example 21 optionally includes wherein determining adjustments to the drag to align the projected trajectory with the desired user flightpath comprises applying a perturbation process to current user dive parameters until the desired user flightpath and actual flight path are aligned.

In Example 23, the subject matter of Example 22 optionally includes wherein the dive parameters comprise a user drag coefficient through the air, user horizontal speed through the air, and user heading through the air.

In Example 24, the subject matter of Example 23 optionally includes measuring the user horizontal speed through the air based on data from a global position satellite receiver.

In Example 25, the subject matter of any one or more of Examples 16-24 optionally include wherein determining the drag of the user through air comprises determining the drag of the user through the air at a constant rate prior to parachute deployment or landing.

Example 26 is at least one computer-readable medium comprising instructions for executing skydiving trajectory and coordination feedback that, when executed by a computer, cause the computer to perform any one of the method Examples 16-25.

Example 27 is an apparatus comprising means for performing any of the methods of Examples 16-25.

Example 28 is a method for skydiving trajectory and coordination feedback, the method comprising: receiving a desired user flightpath in a controller of a plurality of controllers, each controller coupled to a respective user; pairing the plurality of controllers with each other; detecting when the controller and respective user has jumped from an elevation; determining a terminal velocity of the user through air based on a cross-sectional area of the user; determining a drag of the user based on the terminal velocity; determining a projected trajectory of the user through the air based on the drag; determining adjustments to the drag to align the projected trajectory with the desired user flightpath; and generating user feedback comprising indications of the adjustments to the drag.

In Example 29, the subject matter of Example 28 optionally includes assigning the controller and respective user having a lowest altitude relative to other paired controllers as a master controller.

In Example 30, the subject matter of Example 29 optionally includes each of the paired controllers broadcasting their respective projected trajectory to others of the paired controllers.

In Example 31, the subject matter of Example 30 optionally includes the master controller transmitting its respective dive parameters to others of the paired controllers, wherein the dive parameters comprise drag coefficient, horizontal speed, and heading of the respective user.

Example 32 is at least one computer-readable medium comprising instructions for executing skydiving trajectory and coordination feedback that, when executed by a computer, cause the computer to perform any one of the method Examples 28-31.

Example 33 is an apparatus comprising means for performing any of the methods of Examples 28-31.

Example 34 is a system for skydiving trajectory and coordination feedback, the system comprising: means for receiving a desired user flightpath; means for detecting when a user has jumped from an elevation; means for determining a drag of the user through air; means for determining a projected trajectory of the user through the air based on the drag; means for determining adjustments to the drag to align the projected trajectory with the desired user flightpath; and means for generating user feedback comprising indications on the adjustments to the drag.

In Example 35, the subject matter of Example 34 optionally includes means for calibrating position devices, located on limbs of the user, to a reference point on the user.

In Example 36, the subject matter of any one or more of Examples 34-35 optionally include means for pairing a first controller on the user with at least a second controller on a second user to form a network of controllers.

In Example 37, the subject matter of Example 36 optionally includes means for determining an altitude for each of the first and second controllers; means for setting the first controller to be a master controller when the first controller comprises a lower altitude than the second controller; and means for setting the second controller to be the master controller when the second controller comprises a lower altitude than the first controller.

In Example 38, the subject matter of Example 37 optionally includes means for monitoring, over a radio channel, sensor data received from other controllers in the network of controllers.

In Example 39, the subject matter of any one or more of Examples 34-38 optionally include means for determining a terminal velocity of the user through the air based on a cross-sectional area of the user.

In Example 40, the subject matter of Example 39 optionally includes means for applying a perturbation process to current user dive parameters until the desired user flightpath and actual flight path are aligned.

In Example 41, the subject matter of Example 40 optionally includes wherein the dive parameters comprise a user drag coefficient through the air, user horizontal speed through the air, and user heading through the air.

In Example 42, the subject matter of any one or more of Examples 40-41 optionally include means for measuring the user horizontal speed through the air based on data from a global position satellite receiver.

In Example 43, the subject matter of any one or more of Examples 34-42 optionally include means for determining the drag of the user through the air at a constant rate prior to parachute deployment or landing.

Example 44 is a system for skydiving trajectory and coordination feedback, the system comprising: means for receiving a desired user flightpath in a controller of a plurality of controllers, each controller coupled to a respective user; means for pairing the plurality of controllers with each other; means for detecting when the controller and respective user has jumped from an elevation; means for determining a terminal velocity of the user through air based on a cross-sectional area of the user; means for determining a drag of the user based on the terminal velocity; means for determining a projected trajectory of the user through the air based on the drag; means for determining adjustments to the drag to align the projected trajectory with the desired user flightpath; and means for generating user feedback comprising indications of the adjustments to the drag.

In Example 45, the subject matter of Example 44 optionally includes means for assigning the controller and respective user having a lowest altitude relative to other paired controllers as a master controller.

In Example 46, the subject matter of Example 45 optionally includes means for each of the paired controllers to broadcast their respective projected trajectory to others of the paired controllers.

In Example 47, the subject matter of Example 46 optionally includes means for the master controller to transmit its respective dive parameters to others of the paired controllers, wherein the dive parameters comprise drag coefficient, horizontal speed, and heading of the respective user.

Example 48 is a computer-readable medium comprising instructions for executing skydiving trajectory and coordination feedback that, when executed by a computer, cause the computer to: receive a desired user flightpath; detect when a user has jumped from an elevation; determine a drag of the user through air; determine a projected trajectory of the user through the air based on the drag; determine adjustments to the drag to align the projected trajectory with the desired user flightpath; and generate user feedback comprising indications on the adjustments to the drag.

In Example 49, the subject matter of Example 48 optionally includes wherein the instructions cause the computer to determine adjustments to the drag to align the projected trajectory with the desired user flightpath by applying a perturbation process to current user dive parameters until the desired user flightpath and actual flight path are aligned.

In Example 50, the subject matter of Examples 48-49 optionally includes wherein the dive parameters comprise a user drag coefficient through the air, user horizontal speed through the air, and user heading through the air.

In Example 51, the subject matter of Examples 48-50 optionally includes wherein the instructions further cause the computer to measure the user horizontal speed through the air based on data from a global position satellite receiver.

In Example 52, the subject matter of any one or more of Examples 48-51 optionally include wherein the instructions cause the computer to determine the drag of the user through air by determining the drag of the user through the air at a constant rate prior to parachute deployment or landing.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for skydiving trajectory and coordination feedback for a user during a skydive jump, the system comprising:
   a controller coupled to a plurality of sensor inputs, the controller to determine a user drag through air during the skydive jump based on input data from the plurality of sensor inputs, the controller to receive a user flightpath of the skydive jump, determine a projected user trajectory of the skydive jump based on the user drag, and determine user drag adjustments to align the projected user trajectory of the skydive jump with the received user flightpath; and
   a feedback device interface coupled to the controller to provide feedback signals to at least one of aural, haptic, or visual feedback devices in response to the user drag adjustments such that the user is able to adjust the skydiving trajectory during the skydive jump.

2. The system of claim 1, wherein the input data comprises barometric pressure, acceleration of the user, global position satellite coordinates of the user, vertical speed of the user, horizontal speed of the user, and heading of the user.

3. The system of claim 1, wherein the controller is further to determine when the user has initiated the skydive jump prior to determining the drag of the user.

4. The system of claim 3, wherein the controller further determines the skydive jump in response to the input data indicating a change in at least one of a user acceleration greater than an acceleration threshold, a user rotation greater than a rotation threshold, a user horizontal velocity greater than a horizontal velocity threshold, or a user altitude rate of change.

5. The system of claim 1, further comprising a speaker coupled to the controller to provide aural feedback to the user regarding the user drag adjustments.

6. The system of claim 1, further comprising a display coupled to the controller to provide visual feedback to the user regarding the user drag adjustments.

7. The system of claim 1, further comprising haptic response devices coupled to the controller to provide haptic feedback to the user regarding the user drag adjustments.

8. The system of claim 1, wherein the plurality of sensors comprise at least one of an accelerometer, magnetometer, gyroscope, altimeter, barometer, thermometer, vertical speed sensor, or global positioning system (GPS) receiver.

9. The system of claim 8, further comprising a plurality of position devices coupled to the controller, the plurality of position devices to determine a relative position of a plurality of limbs of the user, each of the plurality of position devices comprising at least one of the plurality of sensors.

10. The system of claim 9, further comprising a radio and antenna coupled to the controller.

11. The system of claim 10, wherein each of the plurality of position devices comprises a radio to communicate with the radio coupled to the controller.

12. The system of claim 11, wherein the controller is a master network controller of a plurality of network controllers and transmits drag coefficient, horizontal speed, and heading of the user to the plurality of network controllers.

13. A system for skydiving trajectory and coordination feedback for a user during a skydive jump, the system comprising:
   a plurality of sensors for measuring at least one of user altitude, user horizontal speed, or user spin rate during the skydive jump;
   a controller coupled to the plurality of sensors, the controller to determine, based on input data from the plurality of sensors, the skydive jump from an elevation, a coefficient of drag of the user through air, and a projected trajectory of the user through the air, the controller to determine user drag adjustments to align the projected trajectory of the skydive jump with a desired user flightpath; and
   a user feedback device, coupled to the controller, to communicate the user drag adjustments to the user during the skydive jump to enable the user to adjust the flightpath during the skydive jump.

14. The system of claim 13, further comprising a plurality of position devices coupled to the controller, wherein the controller is further to calibrate a relative position of each of the plurality of position devices prior to flight.

15. The system of claim 13, wherein the controller is further to calculate a terminal velocity of the user through the air based on the coefficient of drag of the user and a cross-sectional area of the user.

16. A method for skydiving trajectory and coordination feedback during a skydive jump, the method comprising:
- receiving a desired user flightpath for the skydive jump;
- detecting when a user has initiated the skydive jump from an elevation based on sensor data from sensors indicating a change in altitude and acceleration;
- determining a drag of the user through air during the skydive jump;
- determining a projected trajectory of the user through the air, during the skydive jump, based on the drag;
- determining adjustments to the drag to align the projected trajectory with the desired user flightpath during the skydive jump; and
- generating user feedback to at least one of haptic response devices, a speaker, or a display during the skydive jump, the user feedback comprising indications on the adjustments to the drag t& enable the user to adjust the user flightpath during the skydive jump.

17. The method of claim 16, further comprising calibrating position devices, located on limbs of the user, to a reference point.

18. The method of claim 16, further comprising pairing a first controller on the user with at least a second controller on a second user to form a network of controllers.

19. The method of claim 18, further comprising:
- determining an altitude for each of the first and second controllers, after detecting that the user has jumped;
- setting the first controller to be a master controller when the first controller comprises a lower altitude than the second controller; and
- setting the second controller to be the master controller when the second controller comprises a lower altitude than the first controller.

20. The method of claim 19, further comprising monitoring, over a radio channel, sensor data received from other controllers in the network of controllers.

21. At least one non-transitory computer-readable medium comprising instructions for executing skydiving trajectory and coordination feedback that, when executed by a computer, cause the computer to:
- receive a desired user flightpath of a skydive jump;
- detect when a user has initiated the skydive jump from an elevation;
- determine a drag of the user through air during the skydive jump;
- determine a projected trajectory of the user through the air during the skydive jump based on the drag;
- determine adjustments to the drag to align the projected trajectory with the desired user flightpath during the skydive jump; and
- generate user feedback comprising indications on the adjustments to the drag to enable the user to adjust the user flightpath during the skydive jump.

22. The non-transitory computer-readable medium of claim 21, wherein the instructions cause the computer to determine adjustments to the drag to align the projected trajectory with the desired user flightpath by applying a perturbation process to current user dive parameters until the desired user flightpath and actual flight path are aligned.

23. The non-transitory computer-readable medium of claim 22, wherein the dive parameters comprise a user drag coefficient through the air, user horizontal speed through the air, and user heading through the air.

24. The non-transitory computer-readable medium of claim 23, wherein the instructions further cause the computer to measure the user horizontal speed through the air based on data from a global position satellite receiver.

25. The non-transitory computer-readable medium of claim 21, wherein the instructions cause the computer to determine the drag of the user through air by determining the drag of the user through the air at a constant rate prior to parachute deployment or landing.

* * * * *

UNITED STATES PATENT AND TRADEMARK OFFICE
CERTIFICATE OF CORRECTION

PATENT NO. : 9,863,772 B1  
APPLICATION NO. : 15/194131  
DATED : January 9, 2018  
INVENTOR(S) : Moyerman et al.

Page 1 of 1

It is certified that error appears in the above-identified patent and that said Letters Patent is hereby corrected as shown below:

On the Title Page

In item (22), in "Filed", in Column 1, Line 1, after "2016", insert --¶(65) Prior Publication Data US 2017/0370726 A1 Dec. 28, 2017--

In the Claims

In Column 15, Line 17, in Claim 16, delete "t&" and insert --to-- therefor

Signed and Sealed this  
Twenty-fifth Day of June, 2019

Andrei Iancu  
*Director of the United States Patent and Trademark Office*